US008468608B1

(12) United States Patent
Hernacki et al.

(10) Patent No.: US 8,468,608 B1
(45) Date of Patent: Jun. 18, 2013

(54) ENFORCING DIGITAL RIGHTS MANAGEMENT IN A HETEROGENEOUS ENVIRONMENT

(75) Inventors: Brian Hernacki, San Carlos, CA (US); Sourabh Satish, Fremont, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 969 days.

(21) Appl. No.: 12/414,466

(22) Filed: Mar. 30, 2009

(51) Int. Cl.
*G06F 7/04* (2006.01)

(52) U.S. Cl.
USPC .................................................. 726/27; 726/1

(58) Field of Classification Search
USPC ..................... 726/29, 4, 27, 1, 2, 26; 709/229
See application file for complete search history.

(56) References Cited

U.S. PATENT DOCUMENTS

| 7,509,685 | B2 * | 3/2009 | Lambert | 726/27 |
|---|---|---|---|---|
| 2004/0168184 | A1 * | 8/2004 | Steenkamp et al. | 725/31 |
| 2004/0199787 | A1 * | 10/2004 | Hans et al. | 713/200 |
| 2006/0159109 | A1 * | 7/2006 | Lamkin et al. | 370/401 |
| 2006/0161635 | A1 * | 7/2006 | Lamkin et al. | 709/217 |
| 2007/0061835 | A1 * | 3/2007 | Klein et al. | 725/25 |
| 2007/0067309 | A1 * | 3/2007 | Klein et al. | 707/10 |
| 2007/0266031 | A1 * | 11/2007 | Adams et al. | 707/10 |
| 2008/0046978 | A1 * | 2/2008 | Rieger | 726/4 |
| 2008/0066185 | A1 * | 3/2008 | Lester et al. | 726/27 |

OTHER PUBLICATIONS

Heileman, G.L. et al., "DRM Interoperability Analysis from the Perspective of a Layered Framework," DRM '05, Nov. 7, 2005, Alexandria, VA, USA, ACM, pp. 17-26.
Koenen, R. et al., "The Long March to Interoperable Digital Rights Management," IEEE, 2004, pp. 2-17.
Schmidt, A.U. et al., "Interoperability Challenges for DRM Systems," 2nd Virtual goods Workshop, Ilmenau, Germany, May 2004, [Online] Retrieved from the Internet<URL:http://virtualgoods.tu-ilmenau.de/2004/Interoperability_Challenges_for_DRM_Systems.pdf>.

* cited by examiner

*Primary Examiner* — Samson Lemma
(74) *Attorney, Agent, or Firm* — Fenwick & West LLP

(57) ABSTRACT

A DRM server parses a request received from a client for a content identifier and client classification information. The content identifier identifies the requested content and client classification information describes the capabilities of the client. The DRM server determines a policy for the requested content. The policy specifies rules for determining access rights for the content responsive to the capabilities of the client. The DRM server determines access rights for the requested content responsive to the capabilities of the client and the policy. The DRM manager then provides the requested content and the determined access rights to the client.

17 Claims, 4 Drawing Sheets

ENFORCING DIGITAL RIGHTS MANAGEMENT IN A HETEROGENEOUS ENVIRONMENT

BACKGROUND

1. Field of the Invention

This invention generally relates to network-based delivery of digital content and more specifically enforcing digital rights in such content.

2. Description of the Related Art

Digital rights management ("DRM") technologies allow content owners to restrict usage of content by end users. DRM systems can be used to protect various types of content in various types of computing environments. The content can include, for example, word processor documents, images, e-books, music and software applications.

Increasingly, DRM systems are required to operate in heterogeneous computing environments. For example, the computing environment can include laptop computers, mobile phones, audio players, video players and/or e-book readers. These devices are produced by a variety of different manufacturers and have different capabilities. A laptop computer, for example, might allow any type of content to be e-mailed or otherwise transferred to other computers, while a mobile phone might play audio files but not allow these files to be transferred to another device.

DRM systems apply rights policies to content. When content is transferred to a device the rights policy defines restrictions that limit the ability of other devices to use the content. For example, the rights policy can specify that a word processor document cannot be edited by end users. However, in many instances the DRM system will not provide coverage for all the devices operating in the computing environment. For example, the DRM system may not be able to enforce a read-only policy on a certain device. Thus, in these instances the end-user device may have unlimited use of content that was intended to be restricted, or be unable to receive the content provided by the DRM system.

SUMMARY

The problems described above are addressed by a method, computer-readable storage medium and computer system for delivering content to a client. An embodiment of the method parses a request received from the client for a content identifier and client classification information. The content identifier identifies the requested content and the client classification information describes the capabilities of the client. The method determines a policy for the requested content. The policy specifies rules for determining access rights for the content responsive to the capabilities of the client. The method determines access rights for the requested content responsive to the capabilities of the client and the policy. The method then provides the requested content and the determined access rights to the client.

Embodiments of the computer-readable storage medium and computer system comprise computer program instructions parsing a request for content for a content identifier and client classification information, determining a policy for the requested content, determining access rights for the requested content and providing the requested content and the determined access rights to the client.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
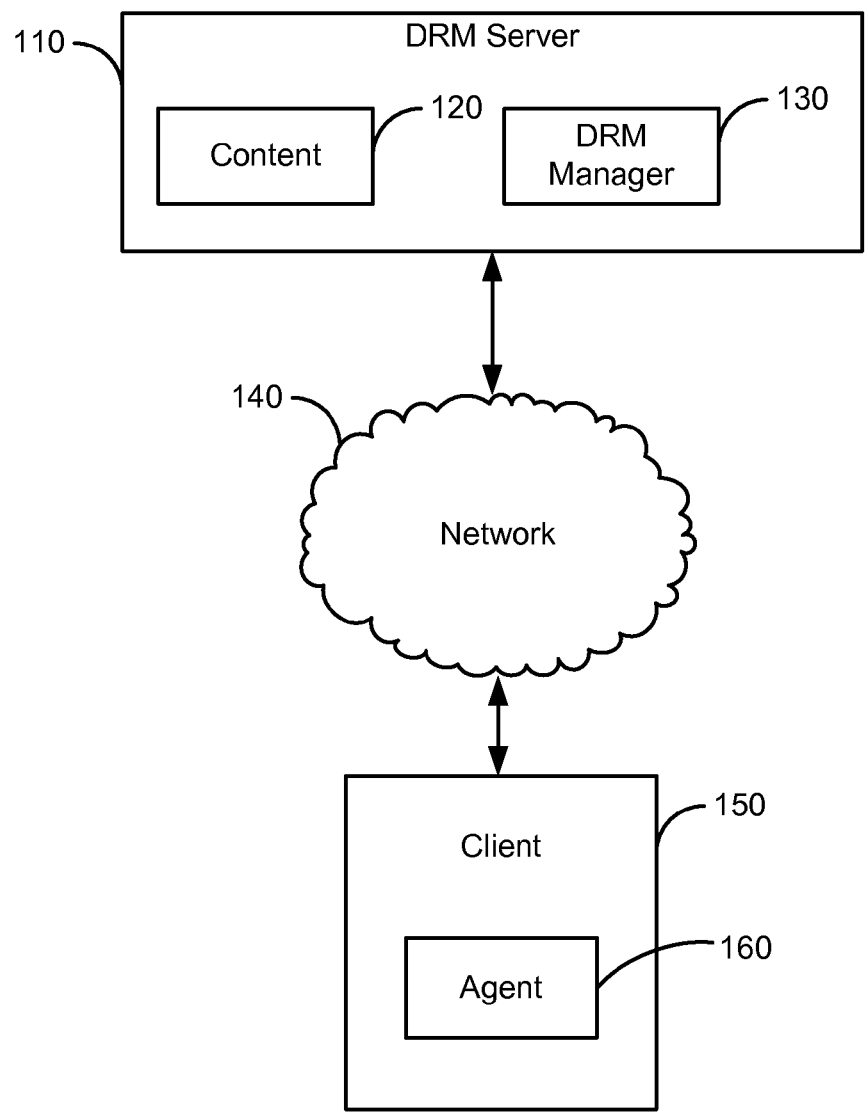
FIG. 1 is a high-level block diagram of a computing environment according to one embodiment.

FIG. 1 is a high-level block diagram of a computing environment 100 according to one embodiment. FIG. 1 illustrates a DRM server 110 and a client 150 connected by a network 140. Only one client 150 is shown in FIG. 1 in order to simplify and clarify the description. Embodiments of the computing environment 100 can have thousands or millions of clients 150, as well as multiple DRM servers 110.

The DRM server 110 enforces DRM restrictions in the computing environment 100. In one embodiment, the DRM server 110 serves content 120 and associated access rights metadata to the client 150 via the network 140. In one embodiment, the DRM server 110 is located at a website provided by Symantec Corporation of Cupertino, Calif., although the DRM server 110 can also be provided by another entity. The DRM server 110 includes a web server adapted to interact with the client 150. The content 120 can be stored on the DRM server 110 or across one or more content servers that are remote from the DRM server 110. In one embodiment, the DRM server 110 receives content identifiers in a request. The DRM server 110 uses a content table to identify the requested content 120 and the location of the content 120.

The content 120 served by the DRM server 110 includes different types of content files stored in various different formats. For example, the content 120 can include different word processor, spreadsheet, image, e-book, audio, video or music content. The various different formats include, for example, Microsoft Word™ documents (DOC), Apple Pages™ documents (PAGES), Office Open XML Text documents (DOCX), Adobe™ Portable Document Format documents (PDF), Lotus 1-2-3™ documents (123), Microsoft Excel™ documents (XLS), Microsoft Windows Bitmap™ image documents (BMP), Compuserve Graphics Interchange Format™ image documents (GIF), Joint Photographic Experts Group image documents (JPEG), Amazon Kindle™ files (AZW), text files (TXT), Open Electronic Book Package files (OPF), Microsoft Windows Media Audio™ audio files (WMA), Apple Advanced Audio Coding™ audio files (AAC), Microsoft Wave™ audio files (WAV), MPEG Layer 3 files (MP3), MPEG Layer 4 files (MP4), content encoded as DivX™ video files (DivX), Apple Audio Video Interleave™ audio files (AVI), including any variants and/or derivatives of the above formats. The content 120 can also contain a number of tags to indicate the location of secure information in the content.

The DRM server 110 includes a DRM manager 130 module. The DRM manager 130 receives a request for content 120 from the client 150. The request for content 120 includes a content identifier and client classification information. The content identifier identifies the specific content 120 being requested by the client. The DRM server 110 identifies a policy for the content 120 based on the content identifier and determines the capabilities of the client 150 based on the client classification information. The policy specifies access rights restrictions for the requested content 120. The access rights for different clients 150 will vary based on the client classification information. Thus, the DRM server 110 determines access rights for the requested content 150 based on the policy for the requested content 120 and the client classification information. The DRM server 110 generates access rights metadata for the client 150 and associates the access rights metadata with the content 120. The DRM server 110 can also transform the content 120 to a different format and/or censor the content 120 based on the policy and/or the client classification information. The DRM server 110 then serves the content 120 and the metadata to the client 150 over the network 140.

For example, assume the DRM server 110 receives a request for content 120. The content identifier indicates that the requested content 120 is a chapter of an e-book in AZW format. The client classification information indicates that the client 150 is a mobile phone that can e-mail documents, but includes an installed PDF viewer program that supports restrictions against e-mailing documents. The DRM server 110 identifies the policy for the requested content 120. The DRM server 110 determines that the policy indicates that the document can only be opened by an application program that supports restrictions against e-mailing documents. Thus, the DRM server 110 makes a policy determination that the document must be converted to PDF format and that the client 150 access rights should include restrictions that require the document to be opened by only the client's PDF viewer and that the viewer should be configured to prevent the client from emailing the document. The DRM server 110 executes this transformation and creates access rights metadata consistent with the policy determinations. The DRM server 110 associates the access rights metadata with the transformed content and delivers the content and the metadata to the client 150 via the network 140.

The client 150 is a computer or other electronic device used by one or more users to perform activities including accessing content 120 received from the DRM server 110. The client 150, for example, can be a personal computer executing a web browser that allows the user to request content 120 from a DRM server web site. In other embodiments, the client 150 is a network-capable device other than a computer, such as a personal digital assistant (PDA), a mobile telephone, a pager, a television "set-top box," e-book reader, audio player, video player, etc.

The client 150 includes an agent module 160 that manages interactions with the DRM server 110 and enforces access rights for content 120. The agent 160 can be integrated into the client 150 operating system, a browser, or another program (e.g., part of a word processor application, audio player, video player, e-book viewer, etc). The agent 160 communicates with the DRM server 110 over the network 140. For example, the agent 160 communicates a request for content 120 to the DRM server 110. In some embodiments the agent 160 also communicates authentication information to the DRM server 110 that authenticates the agent, client and/or end-user. The agent 160 can receive the content 120 and the associated access rights metadata. The agent 160 interprets the access rights metadata for the content 120 and enforces the access rights by configuring the client 150 based on the access rights metadata.

For example, assume the content 120 is a music file and the access rights metadata associated with the content 120 specifies that the music file can only be played on a particular media player. The agent 160 provides client classification information to the DRM server 110 that includes an indication of each media player installed on the client 150. The DRM server 110 determines whether the client 150 has the required media player installed based on information in the client classification information. Assuming the client 150 has the proper media player installed, the DRM server 110 sends the music file and the associated access rights metadata to the client 150. The agent 160 interprets the access rights metadata and configures the client 150 to cause the music file to be opened by only the media player specified by the access rights metadata.

The network 140 enables communications among the entities connected to it. In one embodiment, the network 140 is the Internet and uses standard communications technologies and/or protocols. Thus, the network 140 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
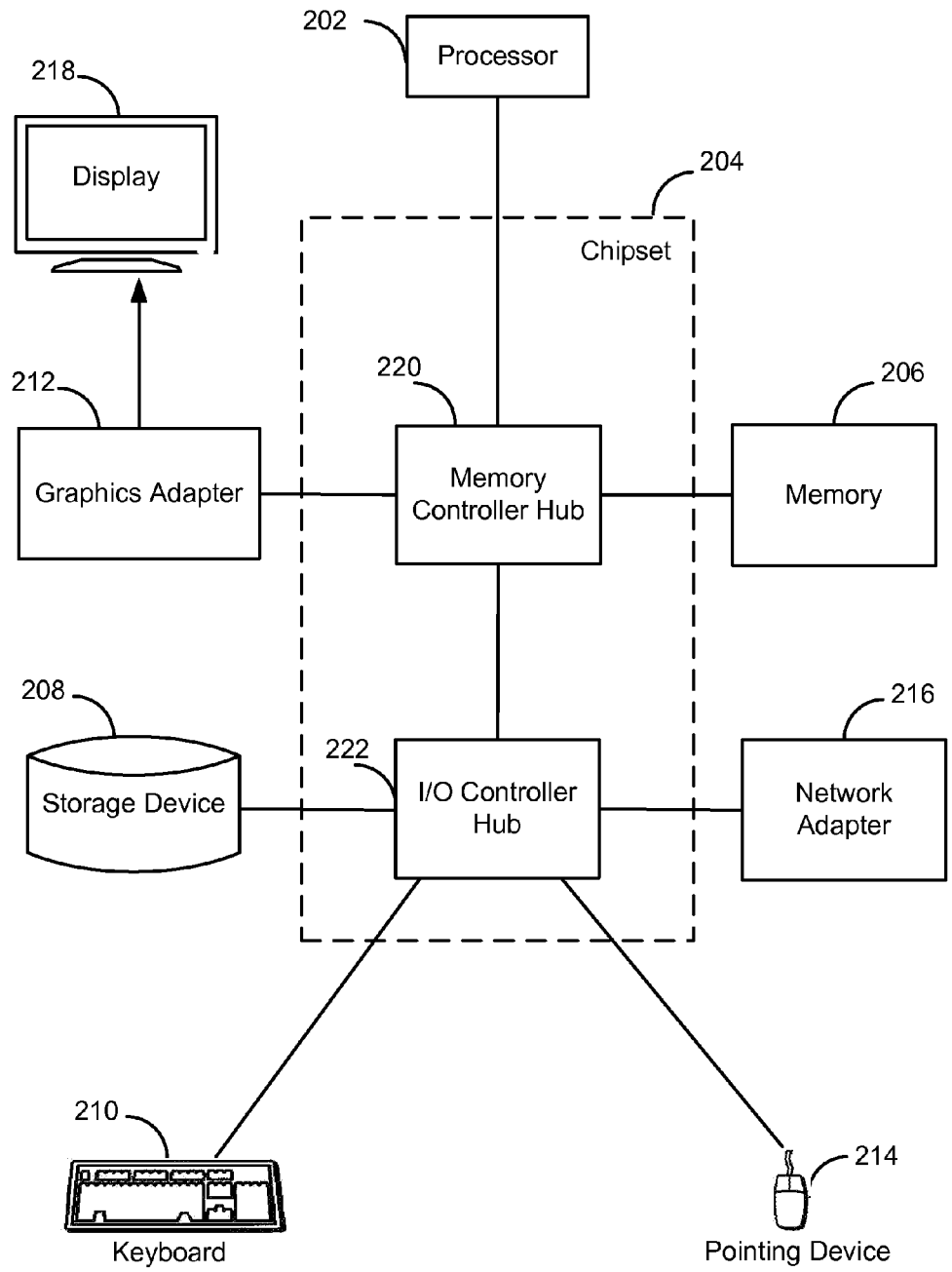
FIG. 2 is a high-level block diagram illustrating an example of a computer for use as a DRM server and/or client according to one embodiment.

FIG. 2 is a high-level block diagram illustrating an example of a computer 200 for use as a DRM server 110 and/or a client 150. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 140. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 150 that is a mobile telephone typically has limited processing power, a small display 218, and might lack a pointing device 214. The DRM server 110, in contrast, may comprise multiple blade servers working together to provide the functionality described herein.

Figure 3:
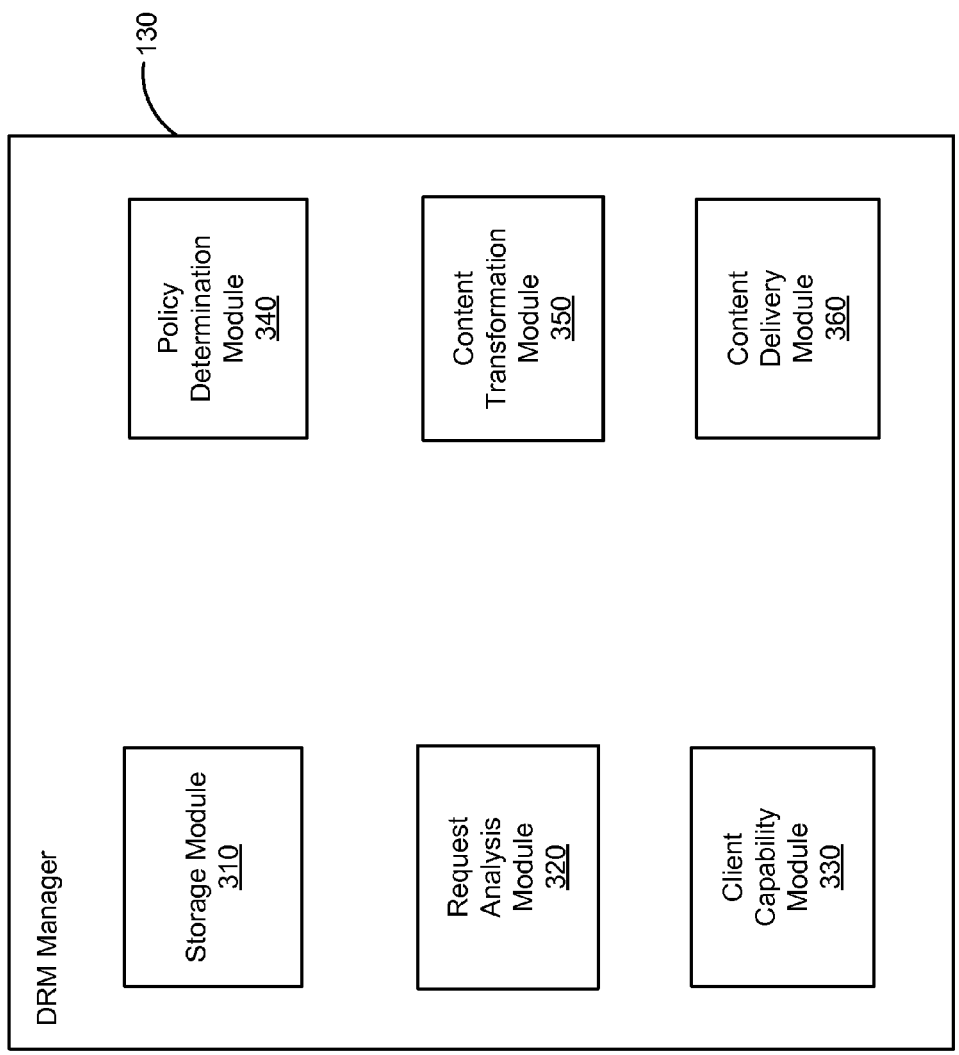
FIG. 3 is a high-level block diagram illustrating modules within a DRM manager according to one embodiment.

FIG. 3 is a high-level block diagram illustrating modules within the DRM manager 130 according to one embodiment. Some embodiments of the DRM manager 130 have different and/or additional modules than the ones described here. Similarly, the functions can be distributed among the modules in a different manner than is described here. Certain modules and functions can be incorporated into other modules of the DRM manager 130 and/or other entities on the network 140, including the DRM server 110 and the client 150.

A storage module 310 stores data used by the DRM manager 130. These data can include the content 120 and/or references to the content 120, policies for the content 120, information about the capabilities of different client devices and/or information related to valid authorization information for the client 150 and/or an entity associated with the client 150.

As stated above, the storage module 310 can either store the content 120 itself or references that are associated with the content 120. The storage module also stores a content table that is used for accessing the content 120. In one embodiment the storage module 310 stores the content 120 on a local database and the content table includes different content identifiers used for accessing the content 120. In an alternative embodiment, the content 120 is stored across one or more remote content servers and the content table includes various different content references that point to the content 120.

In addition to the content table, the storage module 310 also stores a policy table. The policy table includes policies for the content 120 that are identifiable by the content identifiers. The policies specifies rules used by the DRM manager 130 to determine access rights for the content 120 based on the client classification information received from the agent 160.

In one embodiment, a policy can require that the agent 160 provide authentication information for the agent 160, the client 150 and/or a human user of the client 150. The authentication information serves to uniquely identify the entity being authenticated and/or serves a related purpose such as verifying that an entity has not been compromised and can be trusted to enforce the DRM policy. Examples of authentication information include, for example, a digital certificate, an authorization token or an authorization identifier (e.g., an authorization number). The polices can include rules for providing different access rights based on the authentication information. For example, if the requested content 120 is a text-editable word processor file, the policy can indicate that the agent 160 must provide a digital certificate to prove that the agent is a trusted agent. If the agent 160 provides the authentication information, the DRM manager 130 grants the client 150 a certain level of access rights (e.g., the right to edit the document). However, if the agent 160 fails to provide a valid certificate, the DRM manager 130 grants the client 150 different access rights (e.g., instead of being granted the right to edit the document, the client 150 is granted "read-only" access to the document). Alternatively, instead of granting the client 150 different access rights, the DRM manager 130 can transform the document into a more restricted format (e.g., PDF, JPEG, etc.) or deny the request.

As previously described, the policies stored on the storage module 310 include rules that specify different access rights for different clients 150 based on the client classification information received from the agents 160. The client classification information provides information about the client 150 and/or different entities associated with the client 150 (e.g., the agent 160 or a human user of the client 150). The client classification information includes, for example, information about the platform of the client 150, an identifier for the client 150, an identifier for one or more entities associated with the client 150, a class identifier for the client 150, and/or information about the capabilities of the client 150. The capabilities of the client 150 include, for example, the ability of the client 150 to edit, copy, print, save content 120 and/or email content 120. The capabilities of the client 150 also include information about the different access rights that the client 150 can enforce for different types of content 120, including information about the various application programs that are installed on the client 150 and the different types of DRM restrictions that are supported by these application programs.

In one embodiment, the storage module 310 is adapted to store a client capabilities table for determining the capabilities of the client 150 based on the client classification information. The client capabilities table includes information about the capabilities of various different client 150 devices. For example, the client capabilities table can include identifiers for different client 150 devices and a description of the capabilities of these devices. In one embodiment the client capabilities table describes different models of client devices, and the different capabilities of these devices.

In one embodiment, the storage module 310 stores a white list of trusted entities. For example, the storage module 310 includes a white list of trusted clients and the DRM manager 130 can determine that a client 150 is a trusted client based on the client classification information. Similarly, the storage module 310 can also store a blacklist of untrusted entities.

A request analysis module 320 receives a request for content 120 from an agent 160 and parses the request for a content identifier, client classification information and/or authentication information. The request analysis module 320 communicates the content identifier, client classification information and/or authentication information to the different modules of the DRM manager 130. In one embodiment, the request for content 120 comprises an XML file and the request analysis module 320 parses the XML file to extract the information contained therein.

In one embodiment, the request analysis module 320 identifies a policy for requested content and determines that additional information is required from the agent 160. The request analysis module 320 queries the agent 160 for the additional information. For example, the request analysis module 320 can determine that the policy requires that the agent 160 provide authentication information for the client 150 but the agent 160 did not include this information with the request. The request analysis module 320 queries the agent 160 for the authentication information. The request analysis module 320 then receives authentication information from the agent 160 and verifies it.

A client capabilities module 330 determines the capabilities of the client 150. The capabilities of the client 150 can be determined based on information in the client capabilities table or expressly specified by the agent 160. In one embodiment the client capabilities module 330 receives client classification information from the request analysis module 320. As stated above, the client classification information can include a client identifier. The client capabilities module 330 cross-references the client identifier against the client capabilities table and determines the capabilities of the client 150. For example, the client 150 can be an audio player requesting access to an audio file encoded in AAC format. The client capabilities module 300 receives a client identifier, cross-references the identifier against the client capabilities table and determines that the client 150 is an audio player that can play MP3, WAV, or WMA media files, but cannot play AAC media files.

In another embodiment the capabilities of the client 150 are expressly specified by the agent 160. For example, the agent 160 can provide client classification information that includes a client capabilities list. The client capabilities module 330 receives the client capabilities list from the request analysis module 320 and determines the capabilities of the client based on the list. For example, the client capabilities module determines that a client capabilities list specifies that the client 150 is a laptop computer. The client capabilities module also determines that the list specifies the different applications installed on the laptop computer and the different formats and DRM restrictions supported by these applications.

A policy determination module 340 receives the content identifier from the analysis module 320 and the client capabilities information from the client capabilities module 330. The policy determination module 340 interacts with the storage module 310 and cross-references the content identifier against the policy table to identify a policy for the requested content 120. The policy determination module 340 compares the client capabilities information to the policy to determine client access rights for the requested content 120 based on the policy and the client capabilities information. The policy determination module 340 generates metadata for the client 150 based on the client access rights and associates the access rights metadata with the content 120. The access rights metadata can describe which client applications can open the content 120. The access rights metadata can further configure the client applications to enforce different restrictions against the client capabilities.

For example, assume the policy determination module 340 receives a content identifier indicating that the requested content 120 is a particular video file. The policy determination module 340 interacts with the storage module 310 and identifies the policy for that video. The policy indicates that the video cannot be copied, converted to a different format or played on an external display device. The policy determination module 340 receives client capabilities information indicating that the client 150 is a video player that supports playback on external devices and contains a particular playback program that supports DRM restrictions that are consistent with the policy for the video. The policy determination module 340 compares the client capabilities information to the policy for the requested video to determine access rights that are consistent with the policy. The policy determination module 340 then generates access rights metadata that will configure the client 150 so that the video can only be opened using the playback program that allows DRM restrictions. The client access metadata will also configure the playback program to enforce the access rights.

In one embodiment, the DRM manager 130 operates in an enterprise computing environment 100. The client classification information can include a class identifier for the client 150 and the policies can include rules for defining access rights for the content 120 based on the class identifier. The class identifier includes a description of a group of devices to which the client 150 belongs. For example, the class identifier for the device can be based on the capabilities of a group of client devices, or based on a level of trust and/or responsibility associated with a human user of the client 150. Different classes of devices will have different class identifiers, and devices within the same class will have the same access rights. Thus, the policy determination module 340 receives the class identifier from the client capabilities module 330 (or, alternatively, from the request analysis module 320) and compares the class identifier against the policy for the requested content 120 to determine access rights for the client 150.

For example, a human user of the client 150 is a temporary employee in the accounting department and the requested content 120 is a database file containing an actuary table. The client 150 is assigned a class identifier indicating that the client 150 has limited access to most content files because the human user of the client 150 is a temporary employee, and therefore less trusted than other employees. The policy for the actuary table indicates that the client 150 should have read-only access to the content 120 (i.e., the client can view, but not edit, the content) based on the class identifier. The device capabilities information indicates that client 150 has a particular database application that allows read-only DRM restrictions. Thus, the policy determination module 340 generates access rights metadata that will configure the client 150 so that the actuary table can only be opened by the database application allowing read-only DRM restrictions. The access rights metadata will also configure this database application so that the actuary table is opened in read-only format.

In one embodiment the policy determination module 340 determines whether the content 120 should be transformed to a different format in order to enforce the policy for the requested content 120. The determination of whether transformation is required is based on the policy rules for the requested content 120 in view of the client classification information and/or authorization information for the client 150. If transformation is required, the policy determination module 340 generates transformation instructions including information describing a transformation of the content 120 required to enforce the policy.

In one embodiment, the client classification information indicates that the client 150 does not support the format of the requested content 120 and the policy determination module 340 determines that the content 120 must be transformed to a different format. For example, the requested content 120 is a music file encoded in AAC format and the client device can only play MP3, WAV or WMA music files. Thus, the policy determination module 340 determines that the music file must be transformed to either MP3, WAV or WMA format and generates transformation instructions that are consistent with this determination.

In one embodiment, if the client classification information indicates that the client 150 is an untrusted client (i.e., the client cannot be trusted to enforce DRM restrictions), the policy determination module 340 can determine that the content 120 must be transformed to a more secure format. For example, assume the requested content is a text document and the policy for this document indicates that the agent 160 must provide authentication information in order to receive the document in the document's original format. If the agent 160 does not provide the authentication, or if that information is invalid, the policy states that the content 120 must be transformed to a more restricted format. The agent 160 is unable to provide the authentication information. Thus, the policy determination module 340 identifies a more restricted format that is supported by the client 150, e.g., PDF format or an image file format. The policy determination module 340 generates instructions to transform the content 120 to the new format.

The policy determination module 340 can also determine that information in the requested content 120 must be censored in order to enforce the policy for the content 120. The policy determination module 340 can also generate transformation instructions including information about how to censor the content 120 in order to enforce the policy. In one embodiment, the content 120 contains a number of tags identifying sensitive or confidential information. The policy determination module 340 determines if the client 150 is authorized to view the tagged information based on the client classification information and/or authorization information. If the policy determination module 340 determines that the client 150 is not authorized to view the tagged information, the policy determination module 340 can determine that the tagged information, or a subset of the tagged information, should be redacted, extracted or otherwise censored from the content 120. The policy determination module 340 generates transformation instructions that are consistent with this determination.

For example, the requested content 120 is a word processor document containing a list of the names of employees who have reported incidences of sexual discrimination in the work place. The names of each of the employees are tagged to indicate that this information is secure. The policy for this content 120 indicates that only the human resource manager is authorized to view this secure information and that the agent 160 must provide authentication information indicating that the human user of the client 150 is the human resource manager. Thus, the policy determination module 340 determines that the names should be redacted from the document if the agent 160 cannot provide this authentication information and generates transformation instructions that are consistent with this determination.

A content transformation module 350 receives the transformation instructions from the policy determination module and transforms the content 120 as determined by the policy determination module. Transforming the content 120 includes changing the content from one format to a different format that is both consistent with the policy and supported by the client 150. Transforming the content 120 can also include embedding access rights metadata within the transformed content (e.g., the content 120 can be transformed to a PDF file embedded with DRM restrictions). If the transformation instructions indicate that the secure information within the content 120 should be censored, then the transformation module 350 will redact, extract or otherwise censor the secure information, or a subset of the secure information, from the content 120 as indicated by the transformation instructions.

A content delivery module 360 delivers the content 120 and the access rights metadata to the client 150 over the network 140. Once the content 120 and access rights are delivered the agent 160 enforces the access rights metadata associated with the content 120.

Figure 4:
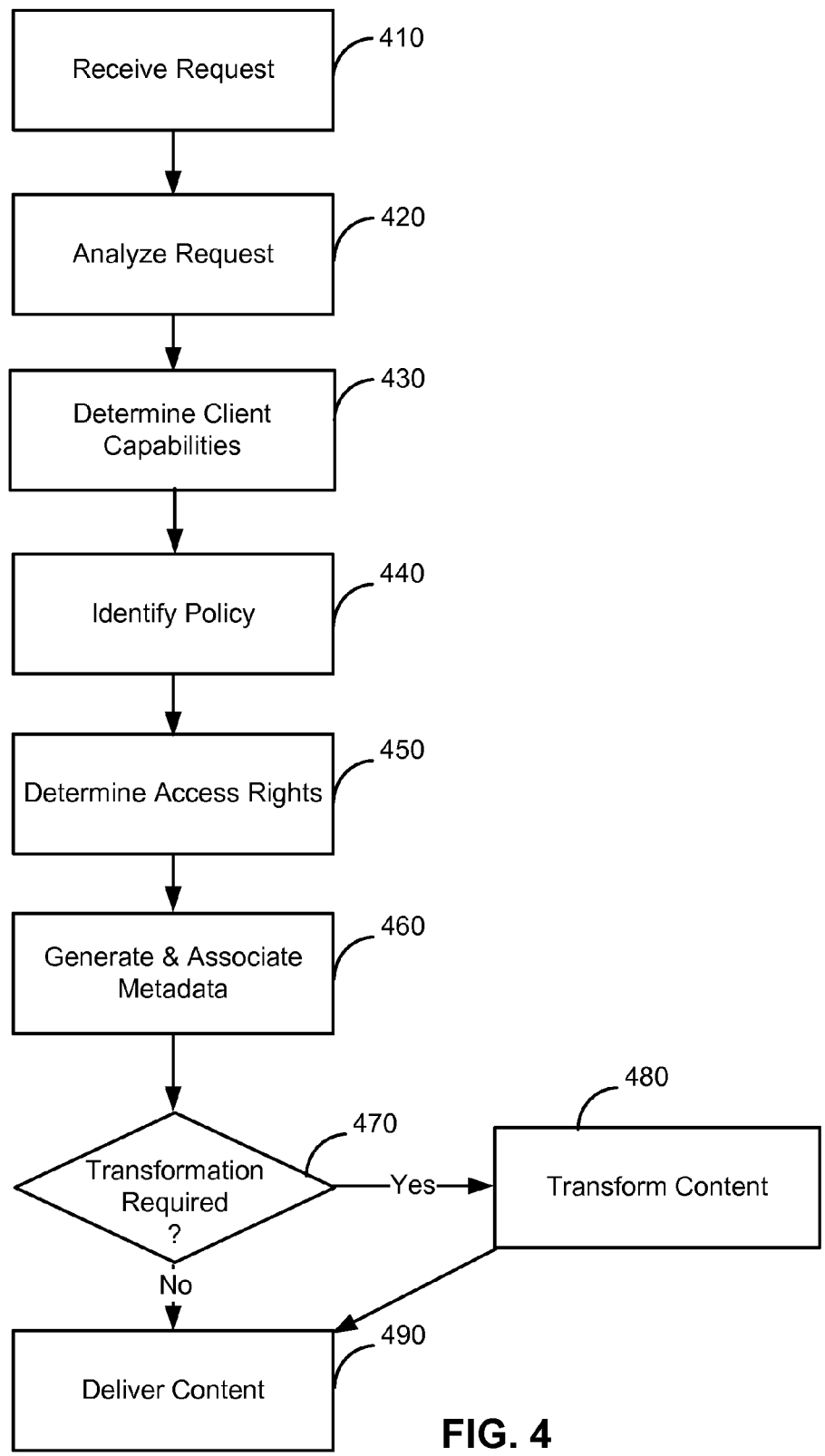
FIG. 4 is a flowchart illustrating steps performed by a DRM manager to determine access rights metadata for content.

FIG. 4 is a flowchart illustrating steps performed by the DRM manager 130 to determine access rights for the requested content 120 according to one embodiment. Other embodiments perform different steps than those shown in the figure and perform the steps in different orders. In addition, some or all of the steps can be performed by entities other than the DRM manager 130.

The DRM manager 130 receives 410 a request for content 120 from the agent 160 operating on the client 150. The DRM manager 130 analyzes 420 the request by parsing a content identifier and client classification information from the request. The DRM manager 130 determines 430 the capabilities of the client 150 based on the client classification information. The capabilities of the client 150 can determined 430 based on a client capabilities list within the client classification information. The capabilities of the client 150 can also be determined 430 by cross-referencing a client identifier received from the agent 160 against a client capabilities table stored on the storage module 310. The DRM manager 130 identifies 440 a policy for the content 120 based on the content identifier and/or the client classification information. The DRM manager 130 determines 450 access rights for the content based on the policy, the client classification information and/or the authorization information. The DRM manager 130 generates 460 the access rights metadata based on the determined policy and associates 460 the access rights metadata with the requested content 120. The DRM manager 130 determines 470 whether the content 120 should be transformed to a different format based on the policy, the client classification information and/or the authorization information. If necessary the DRM manager transforms 480 the content to a format that is consistent with the policy. The DRM manager 130 then delivers 490 the requested content and access rights metadata to the client 150.

In one embodiment, the DRM manager 130 determines policies for the requested content 120 in real-time as requests are received. Alternatively, the policies can be predetermined at an earlier time.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of using a computer to deliver content to a client, comprising:
    using a computer to perform steps comprising:
        parsing a request received from the client for a content identifier identifying requested content, client classification information describing capabilities of the client, and authentication information;
        determining by the computer whether the authentication information is valid;
        determining a policy for the requested content, the policy specifying rules for determining access rights for the content responsive to the capabilities of the client and whether the authentication information is valid;
        determining access rights for the requested content responsive to the capabilities of the client, the policy, and whether the authentication information is valid;
        responsive to the authentication information being invalid, determining a transformation of the requested content to a restricted format that provides for enforcement of the determined access rights for the requested content at the client;
        responsive to the authentication information being invalid, performing the determined transformation of the requested content to produce transformed requested content; and
        providing the transformed requested content and the determined access rights to the client.

2. The method of claim 1, wherein the client classification information includes an identifier of the client and the method further comprises:
    determining the capabilities of the client based on the identifier of the client.

3. The method of claim 2, wherein determining the capabilities of the client comprises:

accessing a client capabilities table that cross-references the client identifier to a set of capabilities of clients having the client identifier.

4. The method of claim 1, wherein determining access rights for the requested content comprises:

identifying access rights restrictions for the requested content specified by the policy;

examining the capabilities of the client to identify capabilities adapted to enforce the identified access rights restrictions; and generating access rights metadata associated with the requested content and adapted to cause the identified capabilities of the client to enforce the identified access rights restrictions at the client.

5. The method of claim 1, further comprising:

generating access rights metadata based on the determined access rights, the access rights metadata adapted to enforce the determined access rights at the client;

associating the access rights metadata with the requested content; and providing the access rights metadata to the client.

6. The method of claim 1, wherein the requested content includes tags identifying sensitive or confidential information, and wherein performing the determined transformation comprises:

removing the information identified by the tags from the requested content.

7. The method of claim 1, wherein the authentication information authenticates one or more of an agent executing on the client, the client, and an end-user of the client.

8. A non-transitory computer-readable storage medium storing executable computer program instructions for delivering content to a client, the computer program instructions comprising instructions for:

parsing a request received from the client for a content identifier identifying requested content, client classification information describing capabilities of the client, and authentication information;

determining whether the authentication information is valid;

determining a policy for the requested content, the policy specifying rules for determining access rights for the content responsive to the capabilities of the client and whether the authentication information is valid;

determining access rights for the requested content responsive to the capabilities of the client, the policy, and whether the authentication information is valid;

responsive to the authentication information being invalid, determining a transformation of the requested content to a restricted format that provides for enforcement of the determined access rights for the requested content at the client;

responsive to the authentication information being invalid, performing the determined transformation of the requested content to produce transformed requested content; and providing the transformed requested content and the determined access rights to the client.

9. The non-transitory computer-readable storage medium of claim 8, wherein the client classification information includes an identifier of the client, further comprising instructions for:

determining the capabilities of the client based on the identifier of the client.

10. The non-transitory computer-readable storage medium of claim 9, wherein determining the capabilities of the client comprises:

accessing a client capabilities table that cross-references the client identifier to a set of capabilities of clients having the client identifier.

11. The non-transitory computer-readable storage medium of claim 8, wherein determining access rights for the requested content comprises:

identifying access rights restrictions for the requested content specified by the policy;

examining the capabilities of the client to identify capabilities adapted to enforce the identified access rights restrictions; and generating access rights metadata associated with the requested content and adapted to cause the identified capabilities of the client to enforce the identified access rights restrictions at the client.

12. The non-transitory computer-readable storage medium of claim 8, further comprising instructions for:

generating access rights metadata based on the determined access rights, the access rights metadata adapted to enforce the determined access rights at the client;

associating the access rights metadata with the requested content; and providing the access rights metadata to the client.

13. The non-transitory computer-readable storage medium of claim 8, wherein the requested content includes tags identifying sensitive or confidential information, and wherein performing the determined transformation comprises:

removing the information identified by the tags from the requested content.

14. A computer system for delivering content to a client, the computer system comprising:

a non-transitory computer-readable storage medium storing executable computer program instructions comprising instructions for:

parsing a request received from the client for a content identifier identifying requested content, client classification information describing capabilities of the client, and authentication information;

determining whether the authentication information is valid;

determining a policy for the requested content, the policy specifying rules for determining access rights for the content responsive to the capabilities of the client and whether the authentication information is valid;

determining access rights for the requested content responsive to the capabilities of the client, the policy, and whether the authentication information is valid;

responsive to the authentication information being invalid, determining a transformation of the requested content to a restricted format that provides for enforcement of the determined access rights for the requested content at the client;

responsive to the authentication information being invalid, performing the determined transformation of the requested content to produce transformed requested content; and providing the transformed requested content and the determined access rights to the client; and a computer processor for executing the computer program instructions.

15. The computer system of claim 14, wherein the client classification information includes an identifier of the client and further comprising instructions for:

determining the capabilities of the client based on the identifier of the client.

16. The computer system of claim 14, wherein determining access rights for the requested content comprises:
- identifying access rights restrictions for the requested content specified by the policy;
- examining the capabilities of the client to identify capabilities adapted to enforce the identified access rights restrictions; and
- generating access rights metadata associated with the requested content and adapted to cause the identified capabilities of the client to enforce the identified access rights restrictions at the client.

17. The computer system of claim 14, further comprising instructions for:
- generating access rights metadata based on the determined access rights, the access rights metadata adapted to enforce the determined access rights at the client;
- associating the access rights metadata with the requested content; and
- providing the access rights metadata to the client.

* * * * *